Patented July 20, 1937

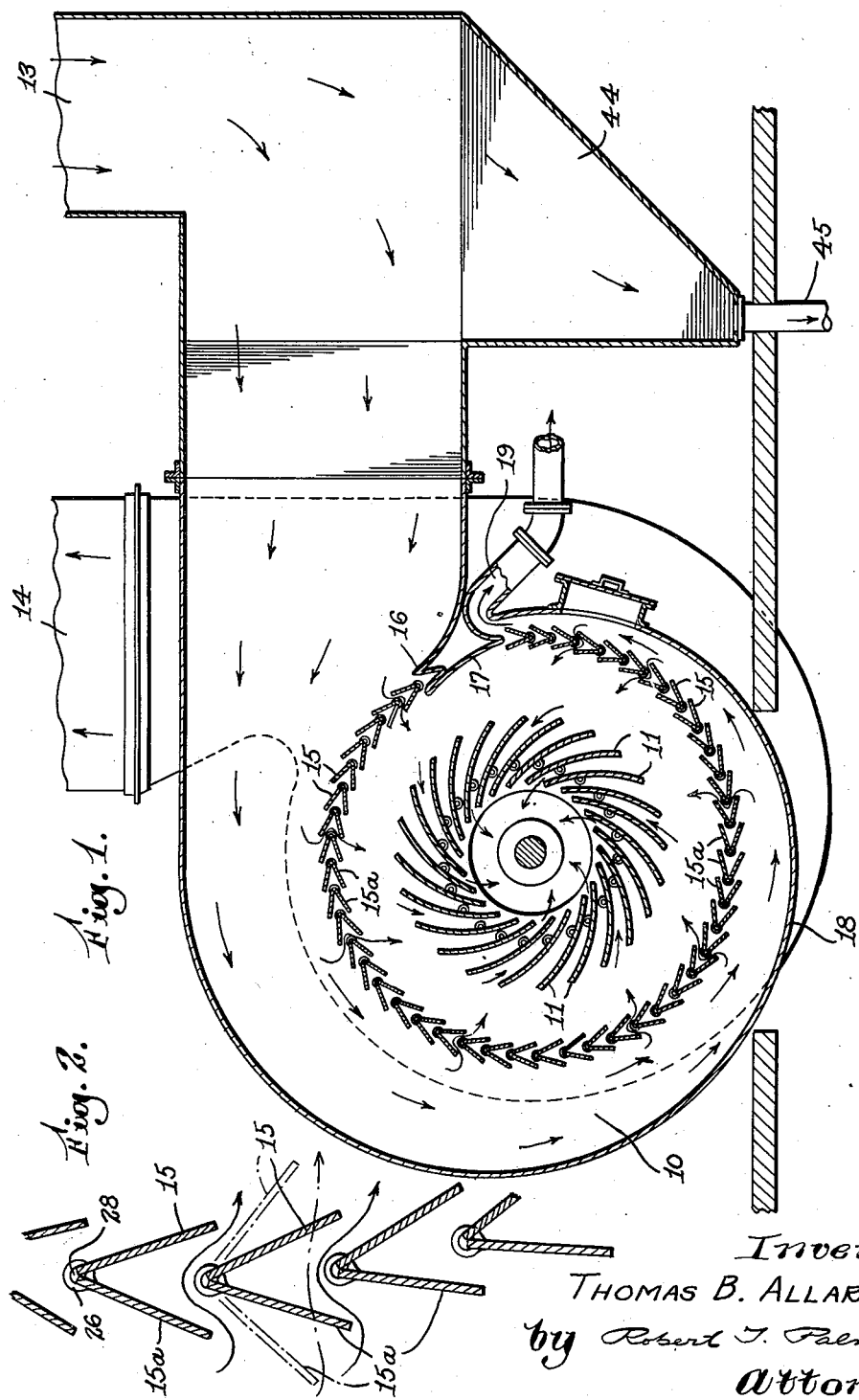

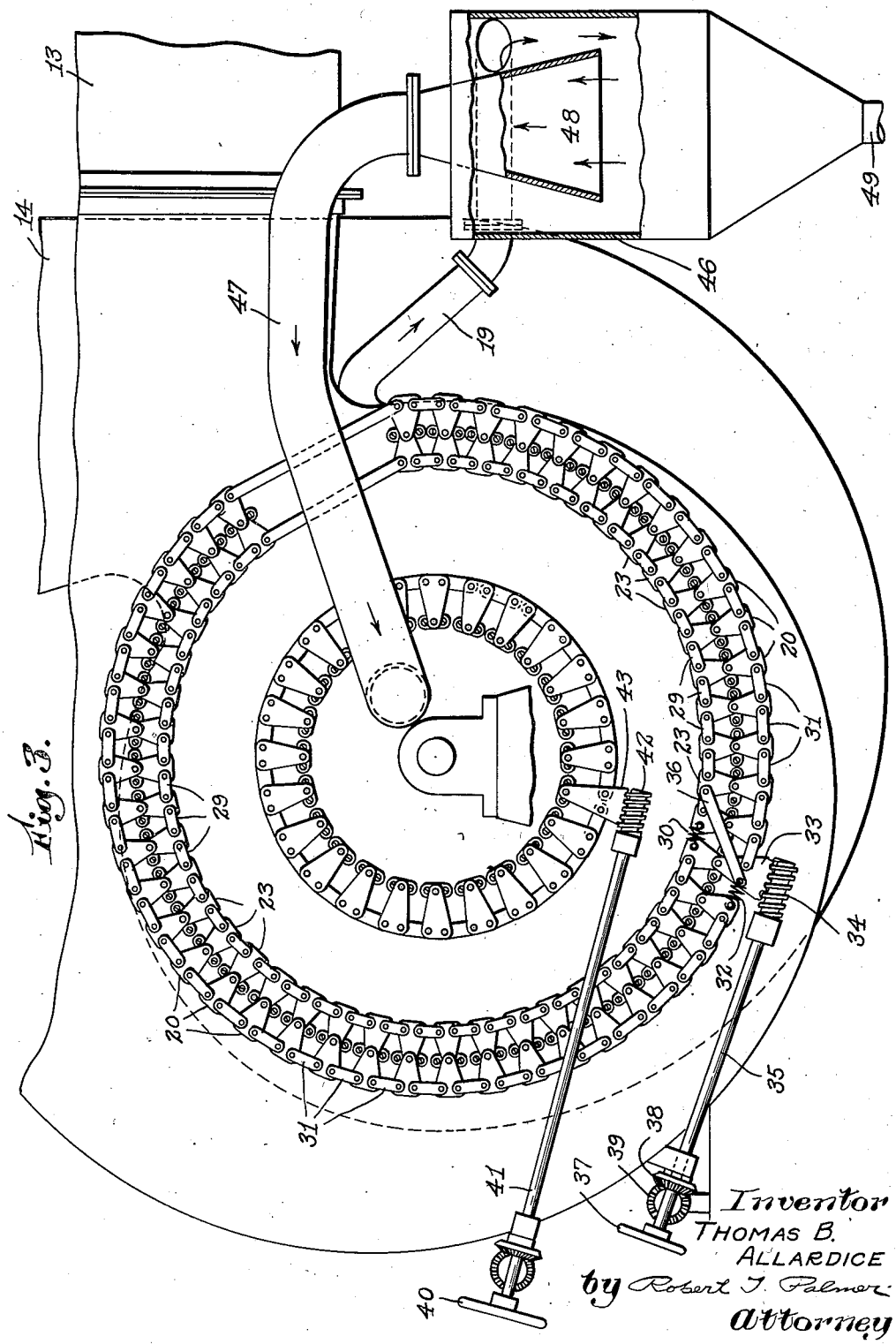

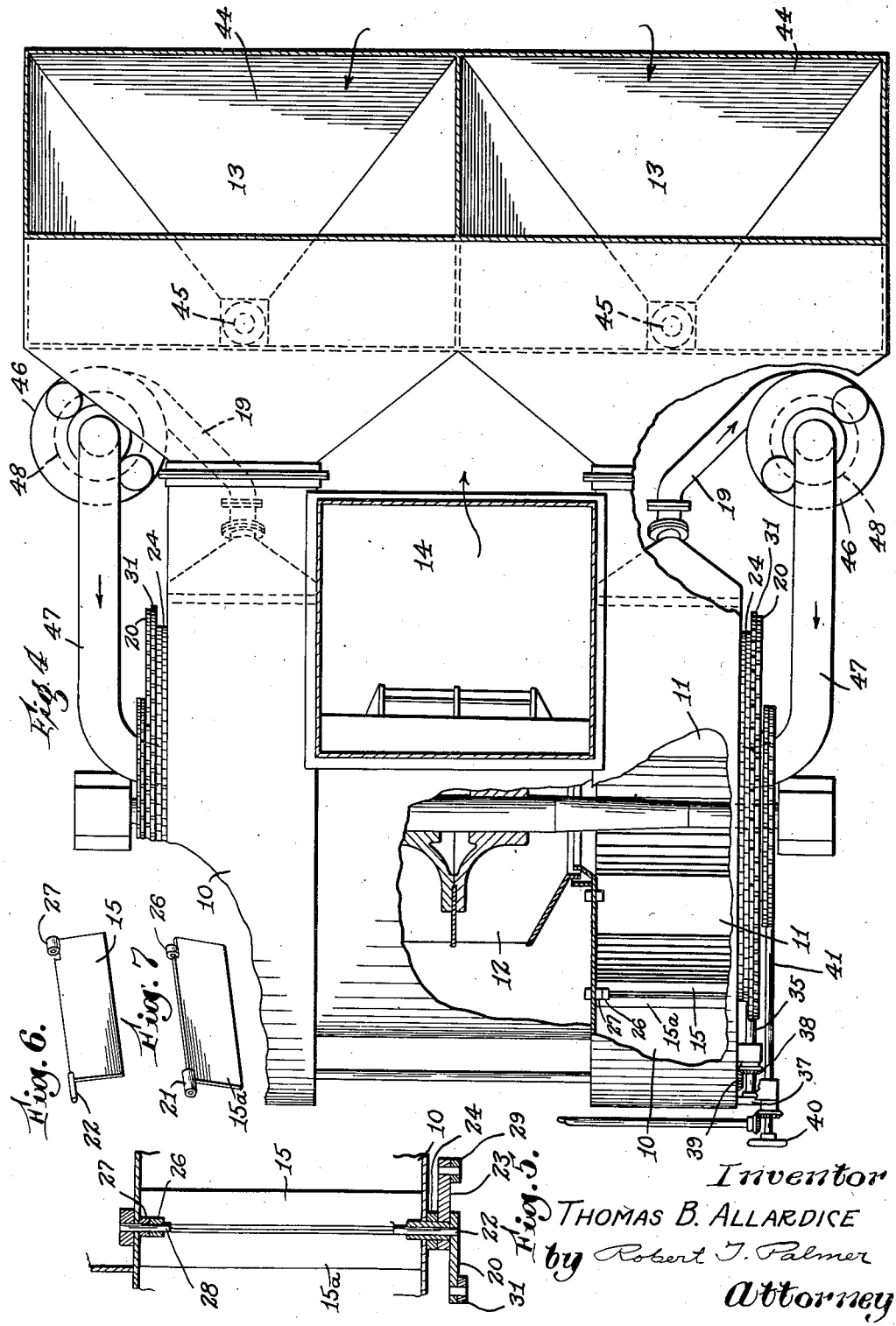

2,087,789

UNITED STATES PATENT OFFICE 2,087,789

CINDER REMOVAL AND DISPOSAL APPARATUS

Thomas B. Allardice, Mountain Lakes, N. J.

Application August 14, 1935, Serial No. 36,096

16 Claims. (Cl. 183—37)

This invention relates to centrifugal gas moving apparatus and relates more particularly to the removal of solid particles from the gas entering a centrifugal fan.

The problem of removal of solid particles such as cinders and clinkers, from gases such as flue gases, in plants such as steam power plants, is a serious and a difficult one, especially where it is desired to utilize induced draft fans. The ordinary filters cause too high a draft loss, occupy too much space and are generally unsuitable.

According to this invention, the solid matter carried by the gases entering a fan is removed by efficient compact apparatus mounted conveniently in the fan casing.

In one embodiment of the invention, a plurality of gas deflecting vanes are provided in the inlet passage of a centrifugal fan and are so arranged as to outline with the casing wall a gas inlet path of gradually decreasing area. The vanes are spaced a small distance apart so that the gas can flow between successive vanes towards the fan wheel but the vanes are so shaped that the gas in order to pour between the vanes is caused to abruptly change its direction of flow, thereby throwing off by centrifugal force the solid particles. The inlet path of decreasing area provides a substantially uniform velocity of flow so that the inertia of the solid particles is utilized in their collection and disposal.

According to a feature of the invention, the deflecting vanes are adjustable in order that the draft loss due to their presence may be decreased where the concentration of solid particles is low enough to justify same.

An object of the invention is to separate from the gases entering a centrifugal fan, any solid particles carried thereby.

Another object of the invention is to provide within the inlet casing of a centrifugal fan, compact and efficient means for the separation of solid particles from the gas entering same.

Other objects of the invention will be apparent from the following description taken together with the drawings.

The invention will now be described with reference to the drawings of which:

Fig. 1 is a side sectional view of apparatus embodying this invention;

Fig. 2 is an enlarged view of the gas deflecting vanes of Fig. 1;

Fig. 3 is a side view of the apparatus of Fig. 1, with a portion in section and illustrates the control mechanism;

Fig. 4 is a plan view with a portion of the casing removed looking downwardly on the apparatus of Fig. 1;

Fig. 5 is a plan view with a portion in section of the vane adjusting mechanism of Figs. 1 and 2;

Fig. 6 is a projected view of one of the members making up the deflector vanes of Figs. 1, 2 and 5, and Fig. 7 is a projected view of the other of the members making up the deflector vanes.

The centrifugal fan illustrated is of the induced draft type such as is disclosed in the U. S. Patent No. 1,846,863 issued Feb. 23, 1932 to Harold F. Hagen. It is preferred that the fan have a volute inlet chamber 10 as illustrated by Fig. 1 of the drawings and the inlet chamber of the fan may be provided with the adjustable control vanes 11 which serve when adjusted towards their closed position to impart a spin to the air entering the fan wheel for the purpose of decreasing the volume of output of the fan without the necessity of varying the speed of the fan driving motor. The construction and operation of the control vanes are fully described in said patent and so will not be referred to in detail herein.

As shown by Figs. 1 and 4, the fan has a central fan wheel 12 with a plurality of radial blades. On each side of the fan wheel 12 are arranged the inlet chambers 10. The gas to be moved passes into the inlets 13, circulates around the scroll of the inlet chamber 10 and passes between the control vanes 11 into the fan wheel with a velocity having magnitude and direction determined by the position of the vanes 11 and finally is delivered by the wheel into the outlet 14.

Referring now to Fig. 1 there is arranged within the inlet chamber 10, an inner wall made up of the plurality of spaced pairs of deflector vanes or plates 15 and 15a, the plates 16 and the curved plate 17. These are so arranged as to form with the wall 18 of the inlet chamber 10, a gas passage of constantly and gradually decreasing area which finally terminates within the outlet pipe 19.

The deflector vane or plates 15 and 15a may be pivoted at a common point and be adjustable between one extreme position shown by Fig. 1 and the full lines of Fig. 2, and the other extreme position shown by the dash-dot lines of Fig. 2. This adjustment is accomplished by the mechanism shown by Figs. 3, 4, 5, 6 and 7.

Referring now to Figs. 5, 6 and 7, the lever 23 is attached to the cylindrical member 21 of the plate 15a. Extending through a central opening in the member 21 is the shaft 22 of the plate 15. The lever 20 is attached to the shaft 22. The inner portions of the plates 15 and 15a are pivoted together by the pin 28 extending through the hinge portion 26 of the plate 15a and the hinge portion 27 of the plate 15. Upon movement of the lever 23, the plate 15a is adjusted through movement of the cylinder member 21 within the bearing 24, and upon movement of the lever 20 the plate 15 is adjusted through movement of the shaft 22 within the cylinder 21 which acts as a bearing for the shaft.

Referring now to Fig. 3, the levers 23 are interconnected by the plurality of links 29 and the tensioning spring 30 and the levers 20 are interconnected by the plurality of links 31 and the tensioning spring 32. To one of the levers 20 is attached the worm segment which meshes with the worm gear 34 on the shaft 35. The worm segment 33 is connected to one of the levers 23 by the arm 36.

Upon movement of the hand wheel, the worm gear 34 rotates the segment 33 to move the levers 20 and their attached plates 15 in one direction and the levers 23 and their attached plates 15a in the opposite direction. Since the fan has two inlets, both provided with similar deflectors, the bevel gears 38 and 39 serve with a transverse shaft and similar bevel gears on the opposite side of the fan to adjust the deflector vanes in both inlet chambers simultaneously.

The hand wheel 40, shaft 41, worm gear 42, gear segment 43 and associated mechanism adjust the position of the spin producing control vanes 11, (Fig. 1) as disclosed fully in said patent.

In operation, the gas enters the inlet passages 13 and then turns at right angles to enter the inlet chambers of the fan. The heavier particles of solid matter are thrown out of the gas on this first described change in direction and fall into the hoppers 44 and pass out the disposal pipes 45.

The gas flowing through each inlet chamber is confined by the casing 18 and is drawn into the rotating fan. A portion of the gas flows through the converging passage between the casing 18 and the inner wall formed by the plurality of deflectors 15 and 15a and the inertia of the solid particles causes them to be carried along with this gas into the outlet pipe 19.

Other portions of the gas flow in a series of branches between the pairs of deflector plates. The portions passing between the spaced deflector plates, due to the shape and arrangement of the plates have their direction abruptly changed with the result that the solid particles due to their greater inertia are thrown out of these branch gas streams into the converging path adjacent the casing 18.

The arrangement of the wall formed by the plurality of deflector plates with respect to the casing 18 of the inlet chamber, is so chosen that the velocity of the gas portion continuing in the converging path formed therebetween, remains substantially constant throughout its length. As a result the solid particles which remain in this path are carried along by the gas portion flowing therein and are carried out of the inlet chamber by the outlet pipe 19.

The outlet pipe 19 is connected tangentially to the cylindrical portion of the hopper 46 as illustrated by Figs. 3 and 4. The gas and solid particles are discharged from the pipe 19 into the interior of the hopper 46 tangentially to the wall of the interior thereof, thus causing the gas to flow around the inner walls of the hopper in which the solid particles under the influence of gravity fall to the bottom.

The suction pipe 47 which is of greater diameter than the outlet pipe 19 has one end connected to the funnel shaped gas intake portion 48 within the hopper 46 and has its other end connected to the suction side of the fan, adjacent the inlet edges of the fan wheel. The gas delivering the solid particles into the hopper 46 is returned to the fan while the solid particles remain within the hopper 46 to be disposed of continuously or intermittently, as desired through the pipe 49.

The suction produced within the hopper 46 aids the flow of the gas and solid particles through the outlet pipe 19 into the hopper 46.

By movement of the handwheel 37, the deflector plates 15 and 15a may be adjusted as previously described, to vary the relative position of the plates so as to decrease the draft loss caused thereby when the concentration of the solid matter is not high.

The characteristics of a system in which the invention is utilized may be such that the deflector plates may be adjusted to a point giving satisfactory balance between draft loss and solid matter removal and this point having been determined, the adjustment need not be changed so long as the characteristics of the system are unchanged.

While the invention has been described in connection with a fan having the adjustable gas direction control vanes 11, it should be understood that the invention is applicable to fans having stationary directional control vanes or without directional control vanes of any type.

Whereas one embodiment of the invention has been described for the purpose of illustration, it should be understood that the invention should not be limited to the exact arrangements described as many departures may be made by those skilled in the art, after having had access to this disclosure, without departing from the spirit of the invention.

What is claimed is:

1. In combination, a fan having a rotor, an inlet chamber for directing gas into said rotor, a plurality of substantially V-shaped spaced deflector vanes so arranged as to provide with the casing of said chamber an inlet passage of gradually decreasing area and to provide a plurality of channels in which the gas is directed towards said rotor in abrupt changes of direction, means for adjusting the position of said vanes about their apices to vary their deflecting action on the gas passing therebetween, and means communicating with said inlet passage at its narrowest portion for disposing of solid matter carried by the gas therein.

2. In combination, a fan having a rotor, a volute inlet chamber for directing gas into said rotor, a plurality of spaced deflector vanes so arranged as to provide between the casing of said chamber and said vanes, an inlet passage of gradually decreasing area and to provide a plurality of channels in which the gas is directed towards said rotor in abrupt changes of direction, means for adjusting the position of said vanes to vary their deflecting action on the gas passing therebetween, and means communicating with said inlet passage for disposing of solid matter carried by the gas therein.

3. In combination, a fan having a rotor, an inlet chamber for directing gas into said rotor, a plurality of spin inducing vanes arranged around the inlet to said rotor, a plurality of spaced deflector vanes around said spin inducing vanes and so arranged as to provide with the casing of said chamber an inlet passage of gradually decreasing area and to provide a plurality of channels in which the gas is directed towards said rotor in abrupt changes of direction, means for adjusting the position of said deflector vanes to vary their deflecting action on the gas passing therebetween, and means communicating with said inlet passage at its narrowest portion for disposing of solid matter carried by the gas therein.

4. In combination, a fan having a rotor, an inlet chamber for directing gas into said rotor, a plurality of spin inducing vanes arranged around the inlet to said rotor, a plurality of spaced deflector vanes around said spin inducing vanes and so arranged as to provide with a wall within said chamber an inlet passage of gradually decreasing area and to provide a plurality of channels in which the gas is directed towards said rotor in abrupt changes of direction, means for adjusting the position of said deflector vanes to vary their deflecting action on the gas passing therebetween, and means communicating with said inlet passage for disposing of solid matter carried by the gas therein.

5. In combination, a fan having a rotor, an inlet chamber for directing gas into said rotor, a plurality of substantially V-shaped, spaced deflector vanes within said chamber and around the inlet to said rotor, means forming with said vanes, an inlet passage of gradually decreasing area to provide a plurality of channels in which the gas is directed towards said rotor in abrupt changes of direction, means for adjusting the position of said vanes about their apices to vary their deflecting action on the gass passing therebetween, and means communicating with said inlet passage at its narrowest portion for disposing of solid matter carried by the gas therein.

6. In combination, a fan having a rotor, an inlet chamber for directing gas into said rotor, a plurality of substantially V-shaped, spaced deflector vanes within said chamber and around the inlet to said rotor, means forming with said vanes, an inlet passage of gradually decreasing area to provide a plurality of channels in which the gas is directed towards said rotor in abrupt changes of direction, means for adjusting the position of said vanes to vary their deflecting action on the gas passing therebetween, and means communicating with said inlet passage for disposing of solid matter carried by the gas therein.

7. In combination, a fan having a rotor, an inlet chamber for directing gas into said rotor, means within said chamber around the inlet to said rotor providing a plurality of channels in which the gas is directed towards said rotor in abrupt changes of direction, means providing with said means, within said chamber, a gas passage of gradually decreasing area, and means terminating said passage within said chamber and providing another passage communicating with said first mentioned passage and the exterior of said chamber.

8. In combination, a fan having a rotor, an inlet chamber for directing gas into said rotor, means within said chamber around the inlet to said rotor providing a plurality of channels in which the gas is directed towards said rotor in abrupt changes of direction, means providing with said means, within said chamber, a gas passage of gradually decreasing area, and means extending across said passage in said chamber and directing the flow from said passage to the exterior of said chamber.

9. In combination, a fan having a rotor, an inlet chamber for directing gas into said rotor, means within said chamber around the inlet to said rotor providing a plurality of channels in which the gas is directed towards said rotor in abrupt changes of direction, and providing with a wall of said chamber, within said chamber, a gas passage of gradually decreasing area, and means terminating said passage within said chamber and providing another passage communicating with said first mentioned passage and the exterior of said chamber.

10. In combination, a fan having a rotor, an inlet chamber for directing gas into said rotor, a plurality of deflectors within said chamber around the inlet to said rotor providing a plurality of channels in which the gas is directed towards said rotor in abrupt changes of direction, means providing with said deflectors, within said chamber, a gas passage of gradually decreasing area, means terminating said passage within said chamber and providing another passage communicating with said first mentioned passage and the exterior of said chamber, and means for adjusting said deflectors for varying their deflector action and their resistance to gas flow.

11. In combination, a fan having a rotor, an inlet chamber for directing gas into said rotor, a plurality of substantially V-shaped deflectors within said chamber around the inlet to said rotor providing a plurality of channels in which the gas is directed towards said rotor in abrupt changes of direction, means providing with said deflectors, within said chamber, a gas passage of gradually decreasing area, means terminating said passage within said chamber and providing another passage communicating with said first mentioned passage and the exterior of said chamber, and means for adjusting said deflectors about their apices for varying their deflector action and their resistance to gas flow.

12. In combination, a fan having a rotor, an inlet chamber for directing gas into said rotor, a plurality of deflectors in said chamber and around the inlet to said rotor, said deflectors forming with a wall of said chamber, a gas passage of gradually decreasing area which in its narrowest portion extends upwardly to provide substantially vertical gas flow, and means at the uppermost portion of said passage for deflecting the entire gas flow therefrom to a point exterior of said chamber.

13. In combination, a fan having a rotor, an inlet chamber for directing gas into said rotor, a plurality of deflectors in said chamber and around the inlet to said rotor, said deflectors forming with a wall of said chamber, a gas passage of gradually decreasing area which in its narrowest portion extends upwardly to provide substantially vertical gas flow, means at the uppermost portion of said passage for deflecting the entire gas flow therefrom to a point exterior of said chamber, and means adjusting said deflectors for varying their deflector action and their resistance to gas flow.

14. In combination, a fan having a rotor, an inlet chamber for directing gas into said rotor, a plurality of spin inducing vanes around the inlet to said rotor, a plurality of deflector vanes around said spin inducing vanes, said deflectors forming with a wall of said chamber, a gas passage of gradually decreasing area which in its narrowest portion extends upwardly to provide substantially vertical gas flow, and means at the uppermost portion of said passage for deflecting the entire gas flow therefrom to a point exterior of said chamber.

15. In combination, a fan having a rotor, an inlet chamber for directing gas into said rotor, a plurality of spin inducing vanes around the inlet to said rotor, a plurality of deflector vanes around said spin inducing vanes, said deflectors forming with a wall of said chamber, a gas passage of gradually decreasing area which in its narrowest portion extends upwardly to provide substantially vertical gas flow, means at the uppermost portion of said passage for deflecting the entire gas flow therefrom to a point exterior of said chamber, and means for adjusting said deflector vanes for varying their deflector action and their resistance to gas flow.

16. In combination, a fan having a rotor, an inlet chamber for directing gas into said rotor, a plurality of spin inducing vanes around the inlet to said rotor, a plurality of deflector vanes around said spin inducing vanes, said deflectors forming with a wall of said chamber, a gas passage of gradually decreasing area which in its narrowest portion extends upwardly to provide substantially vertical gas flow, means at the uppermost portion of said passage for deflecting the entire flow therefrom to a point exterior of said chamber, means for adjusting said deflector vanes for varying their deflector action and their resistance to gas flow, and means for adjusting said spin inducing vanes for varying their action upon the gas delivered to them through said deflector vanes.

THOMAS B. ALLARDICE.